(12) United States Patent
Watanabe

(10) Patent No.: US 8,602,011 B2
(45) Date of Patent: Dec. 10, 2013

(54) FUEL SUPPLY APPARATUS FOR INTERNAL COMBUSTION ENGINE

(75) Inventor: Takashi Watanabe, Gotemba (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 13/583,804

(22) PCT Filed: Mar. 23, 2010

(86) PCT No.: PCT/JP2010/054931
§ 371 (c)(1),
(2), (4) Date: Sep. 10, 2012

(87) PCT Pub. No.: WO2011/117961
PCT Pub. Date: Sep. 29, 2011

(65) Prior Publication Data
US 2013/0000607 A1    Jan. 3, 2013

(51) Int. Cl.
*F02B 13/00* (2006.01)
(52) U.S. Cl.
USPC .............................. 123/575; 701/104; 60/295
(58) Field of Classification Search
USPC ................. 123/1 A, 575–578, 672, 676, 698; 701/102–104
See application file for complete search history.

(56) References Cited

U.S. PATENT DOCUMENTS

| | | | |
|---|---|---|---|
| 8,056,325 B2 * | 11/2011 | Kogo | 60/295 |
| 2011/0192148 A1 * | 8/2011 | Yasui | 60/287 |
| 2012/0029788 A1 * | 2/2012 | Shinoda | 701/102 |
| 2012/0072095 A1 * | 3/2012 | Shinoda | 701/103 |
| 2012/0245825 A1 * | 9/2012 | Nakayama et al. | 701/104 |

FOREIGN PATENT DOCUMENTS

| | | |
|---|---|---|
| DE | 10 2006 025 259 A1 | 12/2007 |
| EP | 1 574 690 A1 | 9/2005 |
| JP | 2001-193511 A | 7/2001 |
| JP | 2002-038980 A | 6/2002 |
| JP | 2003-206772 A | 7/2003 |
| JP | 2004-346841 A | 12/2004 |
| JP | 2005-233135 A | 9/2005 |
| JP | 2007-247452 A | 9/2007 |
| JP | 2008-014215 A | 1/2008 |
| JP | 2008-088864 A | 4/2008 |
| JP | 2008-175159 A | 7/2008 |

OTHER PUBLICATIONS

Extended Search Report issued in corresponding European Patent Application No. 10843546 dated Aug. 14, 2013.

* cited by examiner

*Primary Examiner* — Stephen K Cronin
*Assistant Examiner* — Joseph Dallo
(74) *Attorney, Agent, or Firm* — Sughrue Mion, PLLC

(57) ABSTRACT

A fuel supply apparatus applied to an internal combustion engine (1) which can be operated by gasoline and CNG, wherein the fuel supply apparatus comprises a fuel supply system (18) which supplies separately the gasoline and the CNG to the internal combustion engine (1) and an exhaust gas purifying catalyst (11,12) which purifies exhaust gas discharged from the internal combustion engine (1). It is determined whether or not an exhaust gas purifying performance of the exhaust gas purifying catalyst (11,12) is deteriorated, and when it is determined that the exhaust gas purifying performance is deteriorated, the operation of the fuel supply system (18) is controlled so that the CNG is supplied to the internal combustion engine (1).

4 Claims, 7 Drawing Sheets

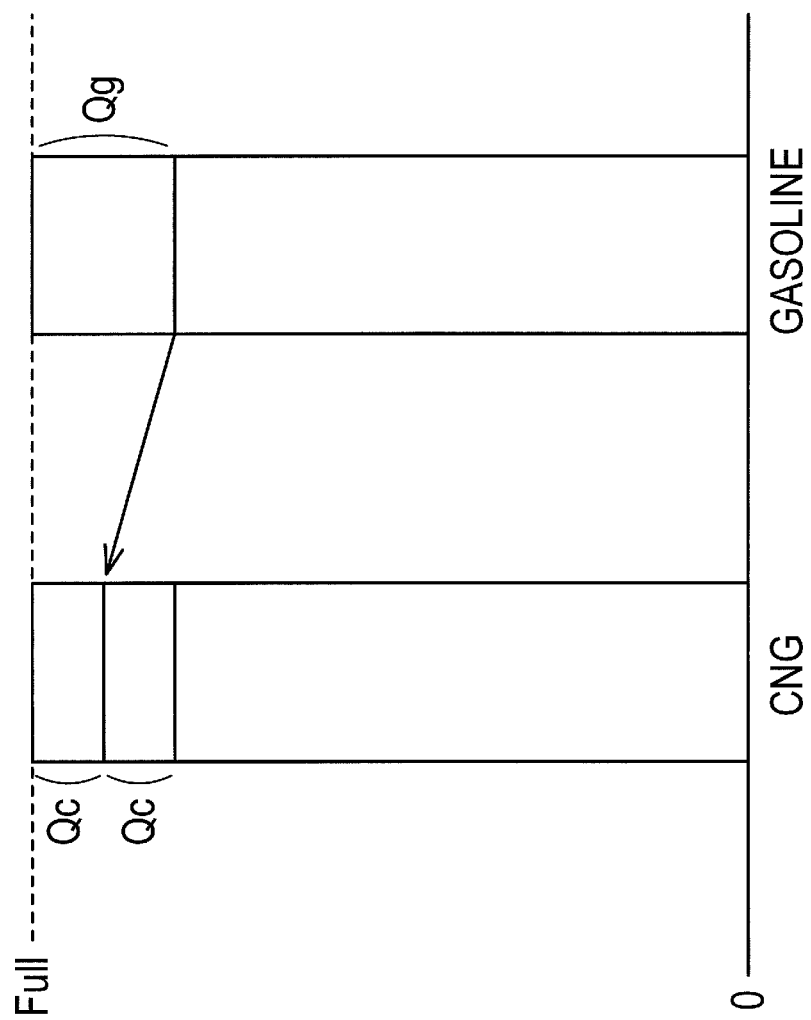

US 8,602,011 B2

FUEL SUPPLY APPARATUS FOR INTERNAL COMBUSTION ENGINE

CROSS REFERENCE TO RELATED APPLICATIONS

This application is a National Stage of International Application No. PCT/JP2011/054931 filed Mar. 23, 2010, the contents of all of which are incorporated herein by reference in their entirety.

TECHNICAL FIELD

The present invention relates to a fuel supply apparatus applied to an internal combustion engine which can be operated by plural kinds of fuels.

BACKGROUND ART

There is known an internal combustion engine which carries plural kinds of fuels, and is operated that a kind of fuel supplied to the internal combustion engine is switched or a rate of plural kinds of fuels supplied to the internal combustion engine is changed depending on operating conditions of the internal combustion engine or a situation. For example, there is known an internal combustion engine which carries an alcohol blended fuel which is fuel blended alcohol with gasoline as a main fuel, and carries gasoline as an auxiliary fuel. In the internal combustion engine, the auxiliary fuel having a good starting performance is used when the internal combustion engine is started up in low temperature. In such internal combustion engines, there is known an internal combustion engine which lights a refueling indicator and urges a refueling of the auxiliary fuel to a driver while decreases an injection quantity of the auxiliary fuel and suppresses a decreasing of the auxiliary fuel when a remaining quantity of the auxiliary fuel is low (see patent literature 1).

CITATION LIST

Patent Literatures

Patent Literature 1: JP-A-2008-014215

SUMMARY OF INVENTION

Technical Problem

In the internal combustion engine which is operated by plural kinds of fuels, when the kinds of fuel supplied to the internal combustion engine is switched or the rate of plural kinds of fuels supplied to the internal combustion engine is changed, a quantity of harmful components in exhaust gas is changed. In the internal combustion engine of the Patent Literature 1, the injection quantity of the auxiliary fuel is decreased or the kinds of fuel is switched, without reference to the changing of the quantity of harmful components in exhaust gas. Thereby, there is a possibility that exhaust emissions is deteriorated when the internal combustion engine is started.

In view of the foregoing, an object of the present invention is to provide a fuel supply apparatus for an internal combustion engine which can suppress a deterioration of the exhaust emissions in each operating conditions as compared with a conventional technique.

Solution to Problem

A fuel supply apparatus for an internal combustion engine of the present invention applies to an internal combustion engine which can be operated by a first fuel and a second fuel which generates after combustion a smaller discharge quantity of harmful components as compared with the first fuel, wherein the fuel supply apparatus comprising: a fuel supply device which supplies separately the first fuel and the second fuel to the internal combustion engine; an exhaust gas purifying catalyst which purifies exhaust gas discharged from the internal combustion engine; a purifying performance determination device which determines whether or not an exhaust gas purifying performance of the exhaust gas purifying catalyst is deteriorated; and a control device which controls an operation of the fuel supply device so as to supply the second fuel more than the first fuel to the internal combustion engine when the purifying performance determination device determines that the exhaust gas purifying performance of the exhaust gas purifying catalyst is deteriorated.

According to the fuel supply apparatus of the present invention, when the purifying performance of the exhaust gas purifying catalyst is deteriorated, the second fuel which generates a smaller discharge quantity of harmful components as compared with the first fuel is supplied. Thereby, it is possible to suppress a deterioration of the exhaust emissions.

A case that a supply quantity of the second fuel is larger than a supply quantity of the first fuel includes a case that the first fuel is zero and the second fuel is only supplied to the internal combustion engine. The discharge quantity of harmful components generated after combustion is a quantity of harmful components which is discharged from the internal combustion engine when fuel is combusted in the internal combustion engine appropriately at the theoretical air-fuel ratio.

In one embodiment of the fuel supply apparatus of the present invention, the fuel supply apparatus may further comprises a first fuel quantity obtaining device which obtains a quantity of the first fuel capable of being supplied to the internal combustion engine, wherein the control device may control the operation of the fuel supply device so as to supply the second fuel more than the first fuel to the internal combustion engine when the quantity of the first fuel obtained by the first fuel obtaining device is equal to or lower than a predetermined determination quantity. By suppressing the supply of the second fuel until the first fuel is reduced, it is possible to remain the second fuel more than the first fuel. In this case, it is possible to supply the second fuel when it is expected to deteriorating the exhaust emission. Thereby, it is possible to suppress a deterioration of the exhaust emissions.

In one embodiment of the fuel supply apparatus of the present invention, the fuel supply device may include a first fuel supply system which supplies the first fuel to a cylinder and a second fuel supply system which supplies the second fuel to the cylinder, wherein the fuel supply apparatus may further comprises, an abnormal determination device which determines whether the second fuel supply system is abnormal, and a warning device which gives a predetermined warning to a user of the internal combustion engine when the abnormal determination device determines that the second fuel supply system is abnormal. By informing to the user that there is a possibility that exhaust emissions is deteriorated in this manner, it is possible to urge a repair of the second fuel supply system. Thereby, it is possible to suppress that the internal combustion engine is left derelict in a condition which cannot be operated by the second fuel. Accordingly, it is possible to suppress a deterioration of the exhaust emissions.

In this embodiment, the control device may control the operation of the fuel supply device so that the first fuel is supplied to the internal combustion engine when the warning device gives the warning. By supplying the first fuel in this manner, it is possible to prevent that the internal combustion engine becomes inoperative.

In one embodiment of the fuel supply apparatus of the present invention, the fuel supply apparatus may further comprises a first fuel storage device which stores the first fuel and a second fuel storage device which stores the second fuel, wherein the control device may adjust a quantity of the first fuel and a quantity of the second fuel which are supplied to the internal combustion engine respectively by controlling the operation of the fuel supply device so that a predetermined quantity of the second fuel is remained in the second fuel storage device when the first fuel storage device is empty. By adjusting the supply quantity of each fuel in this manner, it is possible to remain the second fuel reliably. In this case, since it is possible to supply the second fuel when the purifying performance of the exhaust gas purifying catalyst is deteriorated, it is possible to suppress a deterioration of the exhaust emissions.

The fuels which is supplied to the internal combustion engine is not limited to predetermined fuels. For example, the fuels may include a gaseous fuel of hydrocarbon series and a liquid fuel of hydrocarbon series. As the gaseous fuel of hydrocarbon series, a compressed natural gas is representative. Furthermore, there is known gaseous fuels such as LP gas (Liquefied Petroleum gas) and the like. As the liquid fuel of hydrocarbon series, there is known gasoline, light oil, alcohol, blended fuel which is blended gasoline and alcohol, and the like. As well-known, a discharge quantity of harmful components generated after combustion of the compressed natural gas is lower than a discharge quantity of harmful components generated after combustion of the liquid fuel of hydrocarbon series. In one embodiment of the fuel supply apparatus of the present invention, the first fuel may be a liquid fuel of hydrocarbon series, and the second fuel may be a compressed natural gas.

BRIEF DESCRIPTION OF DRAWINGS

FIG. 7 is a view for describing a supplying method of gasoline and CNG in a plural fuel use mode.

Figure 1:
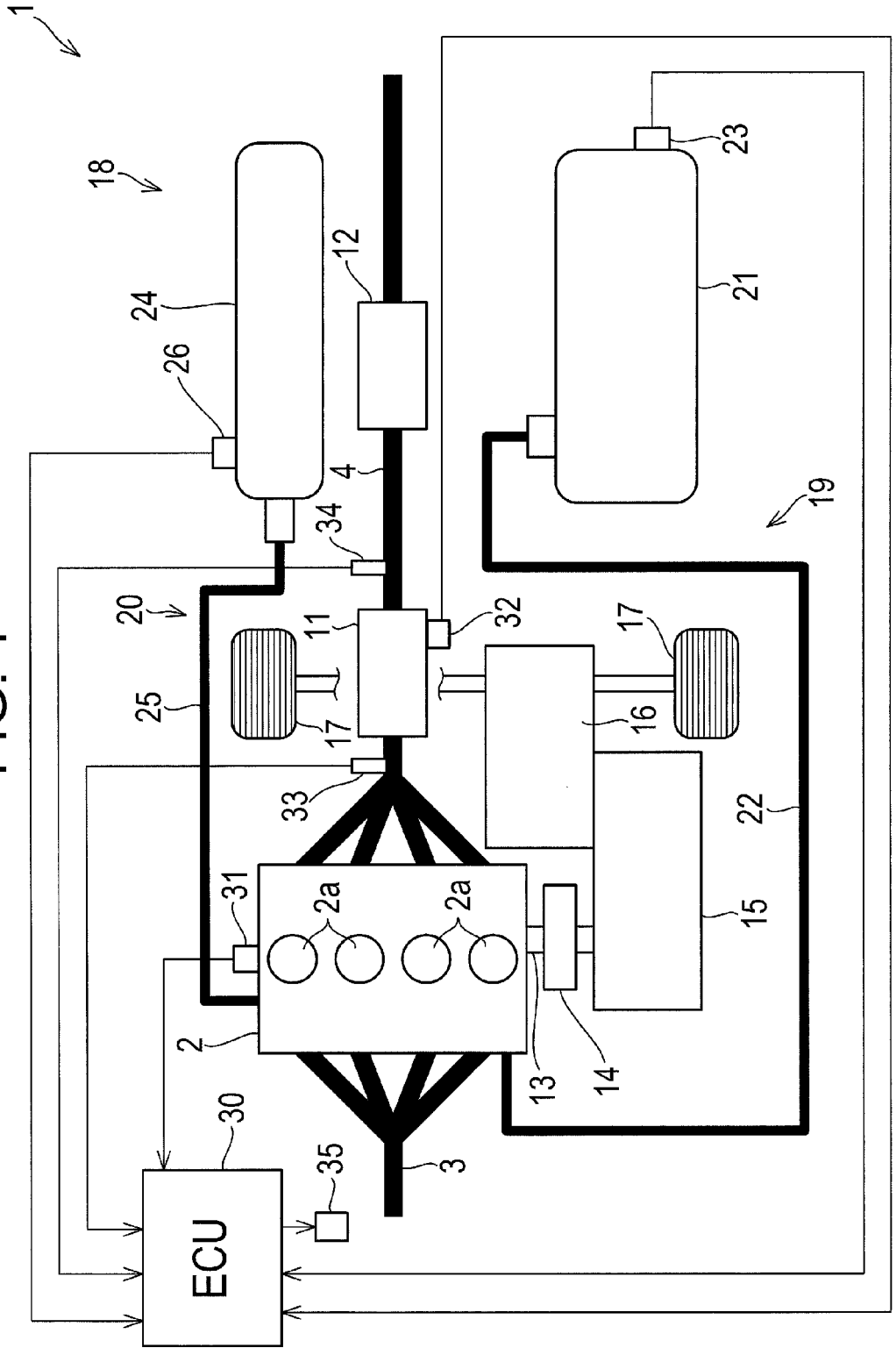
FIG. 1 is a view showing an internal combustion engine incorporated with a fuel supply apparatus according to a first embodiment of the present invention.

DESCRIPTION OF EMBODIMENTS (First Embodiment)
FIG. 1 shows an internal combustion engine in which a fuel supply apparatus according to a first embodiment of the present invention is incorporated. The internal combustion engine (hereinafter, referred to as an engine) 1 is an engine mounted on a vehicle as a traveling power source. The engine 1 is configured as a bi-fuel engine which can be operated by using plural kinds of fuels. The engine 1 can be operated by using compressed natural gas (CNG) as gaseous fuel of hydrocarbon series and gasoline as liquid fuel of hydrocarbon series. As well-known, a quantity of harmful components generated after combustion of the CNG is lower than a quantity of harmful components generated after combustion of the gasoline. Thereby, the gasoline corresponds to a first fuel of the present invention, and the CNG corresponds to a second fuel of the present invention.

Figure 2:
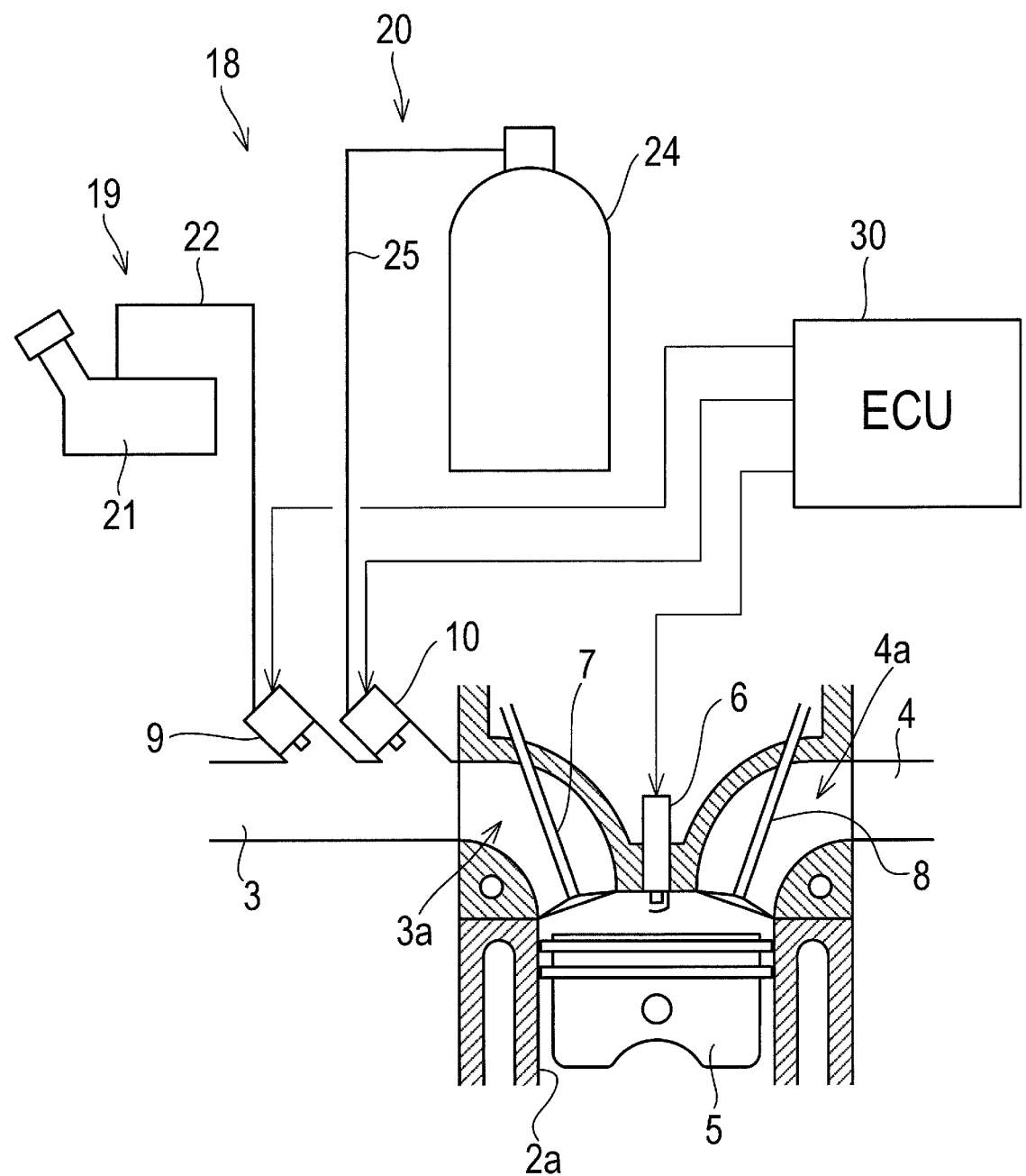
FIG. 2 is an enlarged view showing a cylinder of the internal combustion engine in FIG. 1.

The engine 1 includes an engine main body 2 having plural cylinders 2a (four cylinders in FIG. 1) and an intake passage 3 and an exhaust passage 4 which are connected to each of the cylinders 2a. FIG. 2 is an enlarged view of one cylinder 2a. The other cylinders 2a are also configured as with the cylinder 2a shown in FIG. 2. As shown in this figure, a piston 5 is inserted in the cylinder 2a so as to be movable in a reciprocating manner. Furthermore, in the cylinder 2a, an ignition plug 6 for igniting an air-fuel mixture in the cylinder 2a is provided so that a tip portion of the ignition plug 6 is faced an inside of the cylinder 2a. The intake passage 3 has an intake port 3a which is opened into the cylinder 2a. The exhaust passage 4 has an exhaust port 4a which is opened into the cylinder 2a. The intake port 3a is opened and closed by an intake valve 7. The exhaust port 4a is opened and closed by an exhaust valve 8. As shown in this figure, the intake passage 3 is provided with a first fuel injection valve 9 and a second fuel injection valve 10 to inject fuel in the intake passage 3. The first fuel injection valve 9 and the second fuel injection valve 10 are provided to each cylinder 2a respectively. These fuel injection valves 9, 10 are configured as an electromagnetically-driven fuel injection valve respectively.

As shown in FIG. 1, the exhaust passage 4 is provided with a start catalyst 11 and an under-floor catalyst 12 as an exhaust gas purifying catalyst. These catalyst 11, 12 are provided for purifying harmful substances in exhaust gas. These catalyst 11, 12 are a well-known three-way catalyst respectively. The start catalyst 11 is located an upstream side of the under-floor catalyst 12. A temperature of the start catalyst 11 can be elevated quickly as compared with a temperature of the under-floor catalyst 12. The start catalyst 11 purifies the exhaust gas when mainly a warming-up of the under-floor catalyst 12 is not enough.

The engine main body 2 is provided with a crankshaft 13 which converts a reciprocating motion of the piston 5 into a rotation motion. The rotation of the crankshaft 13 is transmitted to a transmission 15 via a torque converter 14. The rotation which is changed a rotation speed at the transmission 15 is transmitted to a drive wheels 17 via a transfer 16.

The engine 1 is provided with a fuel supply system 18 as a fuel supply device. The fuel supply system 18 includes a gasoline supply system 19 which supplies the gasoline to the engine 1 as a first fuel supply system and a CNG supply system 20 which supplies the CNG to the engine 1 as a second fuel supply system. The gasoline supply system 19 includes a fuel tank 21 which stores the gasoline as a first fuel storage device and a liquid fuel line 22 which connects the fuel tank 21 and each first fuel injection valve 9. The liquid fuel line 22 is provided with a fuel pump (not shown) for feeding the gasoline from the fuel tank 21 to each first fuel injection valve 9. The fuel tank 21 is provided with a remaining quantity sensor 23 which outputs a signal corresponding to a quantity of the gasoline stored in the fuel tank 21 as a first fuel quantity obtaining device. The CNG supply system 20 includes a fuel gas cylinder 24 which stores the pressurized CNG as a second fuel storage device and a gaseous fuel line 25 which connects the fuel gas cylinder 24 and each second fuel injection valve 10. The gaseous fuel line 25 is provided with a pressure regulator (not shown) for keeping a pressure of gas which is supplied to each second fuel injection valve 10 to a predetermined pressure, even if the pressure of the CNG of the fuel gas cylinder 24 changes. The fuel gas cylinder 24 is provided with a pressure sensor 26 which outputs a signal corresponding to the pressure in the fuel gas cylinder 24.

The operations of the first fuel injection valves 9 and the second fuel injection valves are controlled by an engine control unit (ECU) 30 respectively. The ECU 30 is a computer unit including a microprocessor and peripheral devices, such as a RAM and a ROM, which are necessary for the operations of the microprocessor. The ECU 30 is a well-known computer unit which controls operating conditions of the engine 1 based on output signals from various sensors provided to the engine 1. For example, the ECU 30 is connected with a crank angle sensor 31 which outputs a signal corresponding to a rotation speed of the crankshaft 13, a bed temperature sensor 32 which outputs a signal corresponding to a temperature of the start catalyst 11, an A/F sensor 33 which outputs a signal corresponding to an air-fuel ratio of the exhaust gas, and an oxygen concentration sensor 34 which outputs a signal corresponding to an oxygen concentration of the exhaust gas. Furthermore, the ECU 30 is also connected with the above described remaining quantity sensor 23 and pressure sensor 26. In addition to the above sensors, various sensors are further connected to the ECU 30, but they are omitted in the figure. The ECU 30 is connected with a warning indicator 35 which gives a warning to a driver as a warning device.

Figure 3:
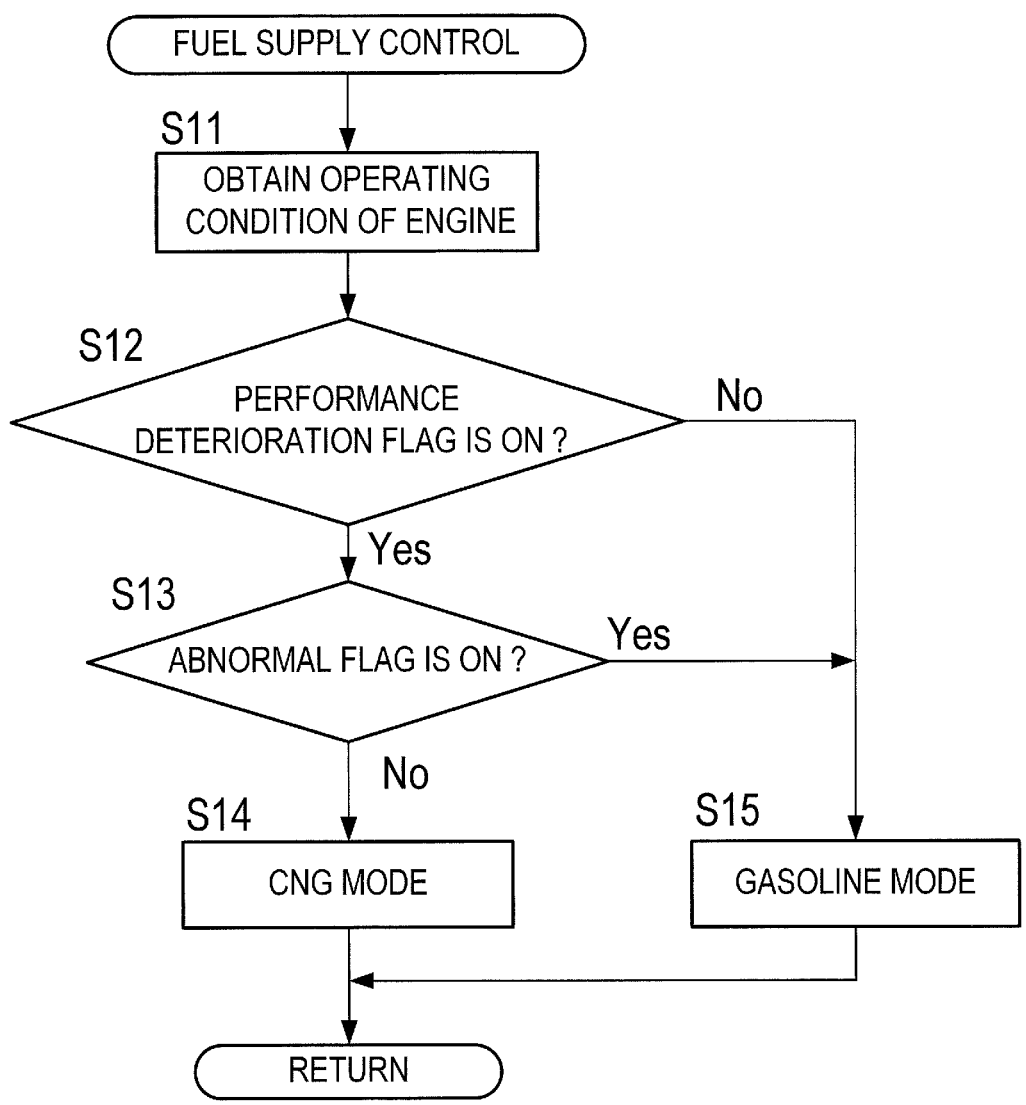
FIG. 3 is a flowchart showing a fuel supply control routine executed by an ECU.

The ECU 30 switches operating modes of the fuel supply system 18 depending on the operating conditions of the engine 1. The operating modes of the fuel supply system 18 are set a gasoline mode which supplies the gasoline to the engine 1 and a CNG mode which supplies the CNG to the engine 1. The ECU 30 switches the operating modes of the fuel supply system 18 by executing a fuel supply control routine shown in FIG. 3. A performance deterioration flag which is used in this control routine is set by a purifying performance determination routine shown in FIG. 4. Furthermore, an abnormal flag is set by an abnormal diagnosis routine shown in FIG. 5. Accordingly, each routine of FIG. 4 and FIG. 5 will be described before describing the routine of FIG. 3.

Figure 4:
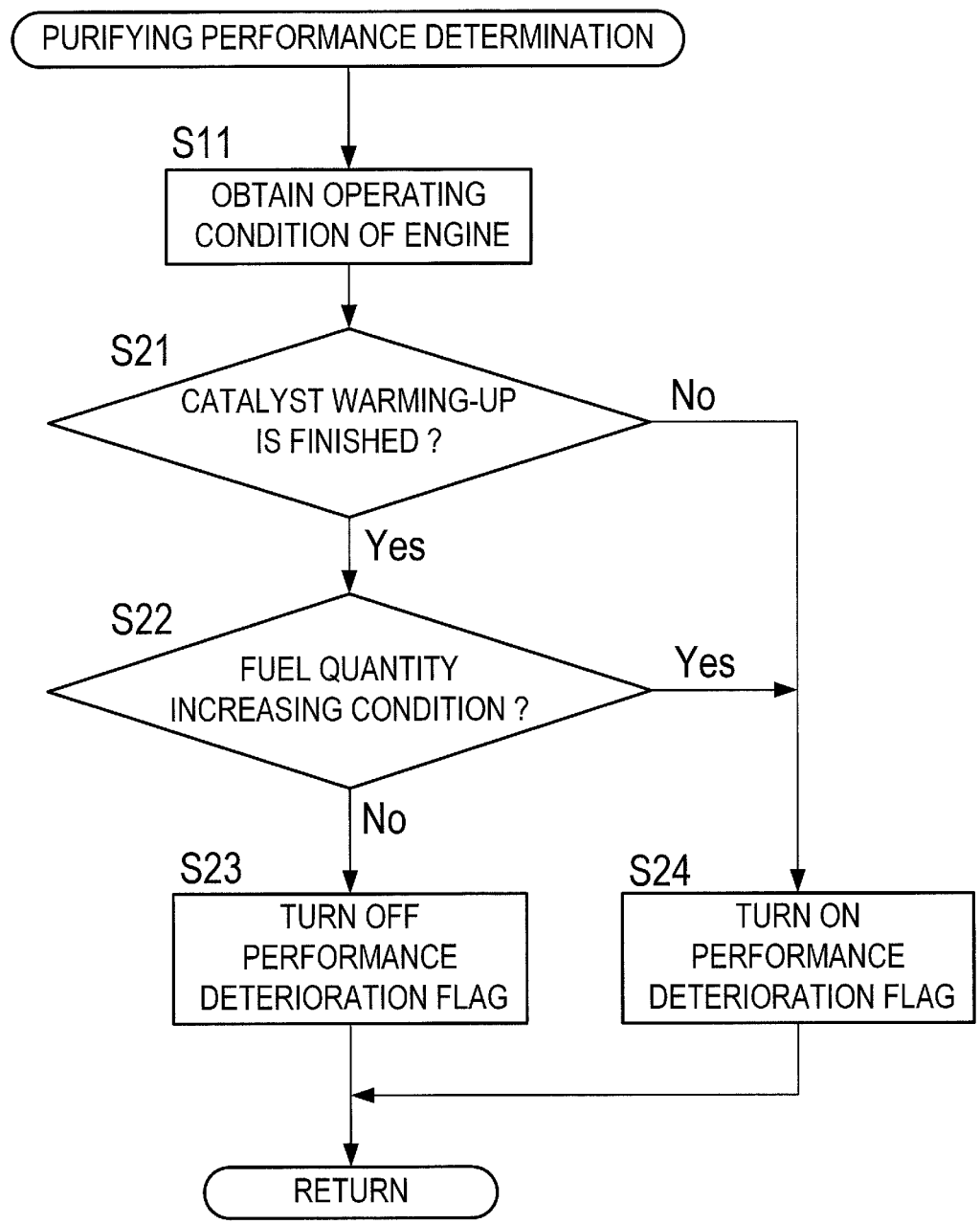
FIG. 4 is a flowchart showing a purifying performance determination routine executed by the ECU.

The routine of FIG. 4 will be described. The routine is executed repeatedly in a predetermined cycle during operation of the engine 1. In the routine, the ECU 30 first obtains the operating condition of the engine 1 at Step S11. For example, the ECU 40 obtains the rotation speed of the engine 1, the temperature of the start catalyst 11, the air-fuel ratio of the exhaust gas, the oxygen concentration of the exhaust gas, a remaining quantity of the gasoline of the fuel tank 21, a residual pressure of the fuel gas cylinder 24 and the like as the operating condition of the engine 1. At next Step S21, the ECU 30 determines whether or not a warming-up of the start catalyst 11 is finished. As well known, the three-way catalyst provides an appropriate exhaust gas purifying performance in a predetermined temperature range. Thereby, in this process, when the temperature of the start catalyst 11 is equal to or higher than a lower limit of the temperature range, it is determined that the warming-up is finished.

If the ECU 30 determines that the warming-up of the start catalyst 11 is finished, the ECU 30 proceeds to Step S22 and determines whether or not the engine 1 is operated in a fuel quantity increasing condition. It is determined whether or not the engine 1 is operated in the fuel quantity increasing condition based on the air-fuel ratio of the exhaust gas. Since it is necessary to operate the engine 1 at high rotational speed when the vehicle is accelerated, the fuel supplied to the engine 1 is increased. In such a case, the air-fuel ratio of the exhaust gas is more rich than the theoretical air-fuel ratio. Further-more, in an engine which is executed a control that a supply quantity of the fuel is increased for preventing an overheat of the piston 5 and the start catalyst 11 when the vehicle runs at high speed, the air-fuel ratio of the exhaust gas is also more rich than the theoretical air-fuel ratio when the supply quantity of the fuel is increased. Accordingly, it is determined that the engine 1 is operated in the fuel quantity increasing condition when the air-fuel ratio of the exhaust gas is more rich than the theoretical air-fuel ratio. As well known, the three-way catalyst provides the appropriate exhaust gas purifying performance when the air-fuel ratio of the exhaust gas is close to the theoretical air-fuel ratio. Thereby, when the fuel quantity supplied to the engine 1 is increased and the air-fuel ratio of the exhaust gas is more rich than the theoretical air-fuel ratio, an exhaust gas purifying performance is deteriorated as compared with a case that the air-fuel ratio of the exhaust gas is the theoretical air-fuel ratio. Accordingly, it is considered that the exhaust gas purifying performance of the start catalyst 11 is deteriorated when the engine 1 is operated in a fuel quantity increasing condition.

If the ECU 30 determines that the engine 1 is not operated in a fuel quantity increasing condition, the ECU 30 proceeds to Step S23 and turns off the performance deterioration flag. Thereafter, the ECU 30 ends the current routine. On the other hand, if the ECU 30 determines that the warming-up of the start catalyst 11 is not finished at Step S21 or determines that the engine 1 is operated in a fuel quantity increasing condition at Step S22, the ECU 30 proceeds to Step S24 and turns on the performance deterioration flag. Thereafter, the ECU 30 ends the current routine. A value of the performance deterioration flag is stored in the ROM of the ECU30 and used in other routines. By executing the purifying performance determination routine, the ECU 30 functions as a purifying performance determination device of the present invention.

Next, the abnormal diagnosis routine of FIG. 5 will be described. This routine is executed repeatedly in a predetermined cycle in spite of the operating conditions of the engine 1. In the routine, the ECU 30 first determines whether or not the engine 1 is in operation at Step S31. If the ECU 30 determines that the engine 1 is stopped, the ECU 30 ends the current routine.

On the other hand, if the ECU 30 determines that the engine 1 is in operation, the ECU 30 proceeds to Step S32 and determines whether or not the pressure of the fuel gas cylinder 24 is equal to or higher than a predetermined determination pressure. The determination pressure is a criterion for determining whether or not a supply of the CNG to the fuel gas cylinder 24 is necessary. Since the criterion is changed based on a capacity of the fuel gas cylinder 24 and the like, the determination pressure is appropriately set depending on the capacity of the fuel gas cylinder 24. If the ECU 30 determines that the pressure of the fuel gas cylinder 24 is less than the determination pressure, the ECU 30 proceeds to Step S35 by skipping Steps S33 and S34. On the other hand, if the ECU 30 determines that the pressure of the fuel gas cylinder 24 is equal to or higher than the determination pressure, the ECU 30 proceeds to Step S33 and performs an abnormal diagnosis process which makes diagnoses of abnormalities of the CNG supply system. In the abnormal diagnosis process, for example, the pressure of the fuel gas cylinder 24 is checked when the second fuel injection valve 10 is opened in the CNG mode. At this moment, if the pressure of the fuel gas cylinder 24 does not change, it is possible to determine that somewhere in the CNG supply system 20 is abnormal. Furthermore, in the gasoline mode, the pressure of the fuel gas cylinder 24 is checked. In the gasoline mode, since the second fuel injection valve 10 is kept in closed condition, the pressure of the fuel gas cylinder 24 does not change. Thereby, if the pressure of the fuel gas cylinder 24 changes in the gasoline mode, it is possible to determine that somewhere in the CNG supply system 20 is abnormal.

At next Step S34, the ECU 30 determines whether or not the CNG supply system 20 is abnormal. If the ECU 30 determines that the CNG supply system 20 is abnormal, the ECU 30 proceeds to Step S35 and performs an abnormal warning process. In the abnormal warning process, for example, the warning indicator 35 is turned on. In addition, various kinds of processing which give the warning to the driver may be performed in the abnormal warning process. At next Step S36, the ECU 30 turns on the abnormal flag. Thereafter, the ECU 30 ends the current routine.

On the other hand, if the ECU 30 determines that the CNG supply system 20 is not abnormal, the ECU 30 proceeds to Step S37 and lifts the abnormal warning which is given in the abnormal warning process. For example, the warning indicator 35 is turned off. At next Step S38, the ECU 30 turns off the abnormal flag. Thereafter, the ECU 30 ends the current routine. A value of the abnormal flag set in this routine is stored in the ROM of the ECU30 and used in other routines. By executing the abnormal diagnosis routine, the ECU 30 functions as an abnormal determination device of the present invention.

Returning to FIG. 3, the fuel supply control routine will be described. The control routine is executed repeatedly in a predetermined cycle during operation of the engine 1. In the control routine, the same processes as those in FIG. 4 are denoted by the same reference numeral as those in FIG. 4, and descriptions thereof will be omitted.

In the control routine, the ECU 30 first obtains the operating condition of the engine 1 at Step S11. At next Step S12, the ECU 30 determines whether or not the performance deterioration flag is ON. If the ECU 30 determines that the performance deterioration flag is ON, the ECU 30 proceeds to Step S13 and determines whether or not the abnormal flag is ON. If the ECU 30 determines that the abnormal flag is OFF, the ECU 30 proceeds to Step S14 and switches the operating mode of the fuel supply system 18 to the CNG mode. Thereafter, the ECU 30 ends the current control routine.

On the other hand, if the ECU 30 determines that the performance deterioration flag is OFF at Step S12 or determines that the abnormal flag is ON at Step S13, the ECU 30 proceeds to Step S15 and switches the operating mode of the fuel supply system 18 to the gasoline mode. Thereafter, the ECU 30 ends the current control routine. By executing the fuel supply control routine, the ECU 30 functions as a control device of the present invention.

According to the fuel supply apparatus of the first embodiment, since the engine 1 is operated in the CNG mode during warming-up of the start catalyst 11, it is possible to suppress a deterioration of the exhaust emissions during the warming-up. Furthermore, in this embodiment, when the residual quantity of the fuel gas cylinder 24 is few or the CNG supply system 20 is abnormal, the engine 1 is operated by the gasoline. Thereby, it is possible to prevent that the engine 1 becomes in a disabled condition. In such a case, since the warning indicator 35 is turned on and the warning is given to the driver, it is possible to urge refuel of the CNG or a repair of the CNG supply system 20. Thereby, it is possible to suppress that the engine 1 is left derelict in a condition which cannot be operated by the CNG.

(Second Embodiment)

Figure 6:
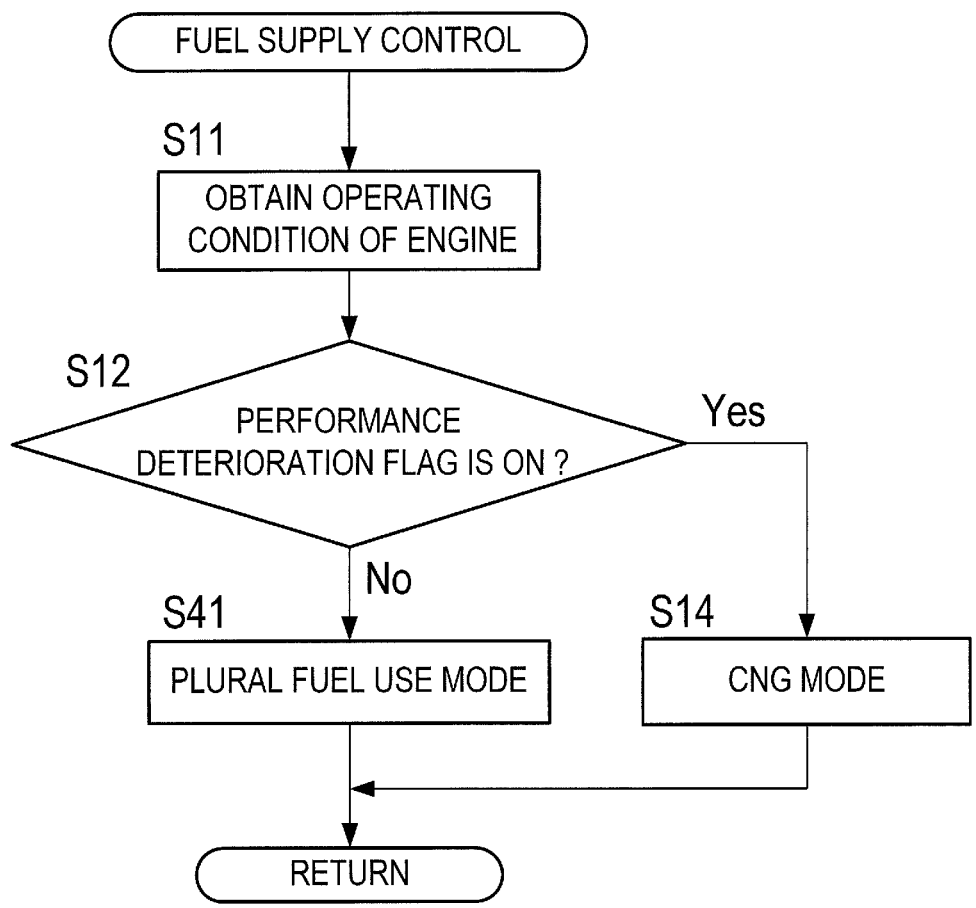
FIG. 6 is a flowchart showing a fuel supply control routine executed by the ECU in a fuel supply apparatus according to a second embodiment of the present invention.

A fuel supply apparatus according to a second embodiment of the present invention will be described with reference to FIG. 6. FIG. 6 shows a fuel supply control routine executed by the ECU 30 in this embodiment. FIG. 1 and FIG. 2 are referred also in this embodiment with regard to the engine 1. In this embodiment, the same components as those in the first embodiment are denoted by the same reference numeral, and descriptions thereof will be omitted. In this embodiment, the ECU 30 executes the purifying performance determination routine of FIG. 4 repeatedly in the predetermined cycle during operation of the engine 1.

In this embodiment, the operating modes of the fuel supply system 18 are set the CNG mode which supplies the CNG to the engine 1 and a plural fuel use mode which supplies the CNG and the gasoline to the engine 1. The ECU 30 switches the operating modes by executing the fuel supply control routine shown in FIG. 6. This control routine is also executed repeatedly in a predetermined cycle during operation of the engine 1. In the control routine, the ECU 30 first obtains the operating condition of the engine 1 at Step S11. At next Step S12, the ECU 30 determines whether or not the performance deterioration flag is ON. If the ECU 30 determines that the performance deterioration flag is ON, the ECU 30 proceeds to Step S14 and switches the operating mode of the fuel supply system 18 to the CNG mode. Thereafter, the ECU 30 ends the current control routine.

On the other hand, if the ECU 30 determines that the performance deterioration flag is OFF, the ECU 30 proceeds to Step S41 and switches the operating mode of the fuel supply system 18 to the plural fuel use mode. Thereafter, the ECU 30 ends the current control routine. In the plural fuel use mode, at first, the gasoline is only supplied to the engine 1. Thereafter, when the remaining quantity of the gasoline of the fuel tank 21 is equal to or lower than a predetermined determination quantity, the CNG is supplied to the engine 1. In this manner, both fuels are supplied to the engine 1.

In this embodiment, since the CNG is supplied to the engine 1 when the remaining quantity of the gasoline is equal to or lower than the determination quantity in the plural fuel use mode, it is possible to increase an operating time of the engine 1 i.e. a driving time of the vehicle. Furthermore, since the CNG is not in use until the remaining quantity of the gasoline becomes less than the determination quantity, it is possible to remain the CNG reliably. Thereby, it is possible to suppress the deterioration of the exhaust emissions during the warming-up of the start catalyst 11.

A supplying method of the gasoline and the CNG in the plural fuel use mode is not limited to the above-described method. For example, a distance capable of traveling by using the quantity of the gasoline in the fuel tank 21 and a distance capable of traveling by using the quantity of the CNG in the fuel gas cylinder 24 are estimated respectively on the assumption that the engine 1 is operated in a predetermined operating condition. And, fuel capable of traveling long distance than other one may be supplied to the engine 1 in priority. When the distance capable of traveling by using the CNG is estimated, the distance is estimated by using the quantity which is calculated by subtracting an expected quantity to be used in the next warming-up of the start catalyst 11 from the remaining quantity of the CNG in the fuel gas cylinder 24. By supplying two fuels to the engine 1 in this manner, it is possible to use the CNG and the gasoline respectively in the same manner. Thereby, it is possible to align timing of the refuel. Furthermore, it is possible to suppress the deterioration of the exhaust emissions during the warming-up of the start catalyst 11.

Furthermore, in the plural fuel use mode, the gasoline and the CNG may be supplied to the engine 1 alternately on the condition that a quantity of the CNG which is used in the warming-up of the start catalyst 11 is ensured. For example, as shown in FIG. 7, the gasoline is first supplied to the engine 1 until ensuring the quantity Qc of the CNG which is used in the warming-up of the start catalyst 11 from a state that both of the gasoline and the CNG are full. Then, a supply of the gasoline is stopped and a supply of the CNG is started after supplying a predetermined quantity Qg of the gasoline further from a time when the quantity Qc of the CNG is ensured. Thereafter, the CNG and the gasoline is used alternately every time the engine 1 is operated at a predetermined period or every time the vehicle travels a predetermined distance. In such case, since the CNG and the gasoline are used respectively in the same manner, it is possible to align timing of the refuel. Furthermore, since the quantity Qc of the CNG is ensured, it is possible to suppress the deterioration of the exhaust emissions during the warming-up of the start catalyst 11.

Figure 5:
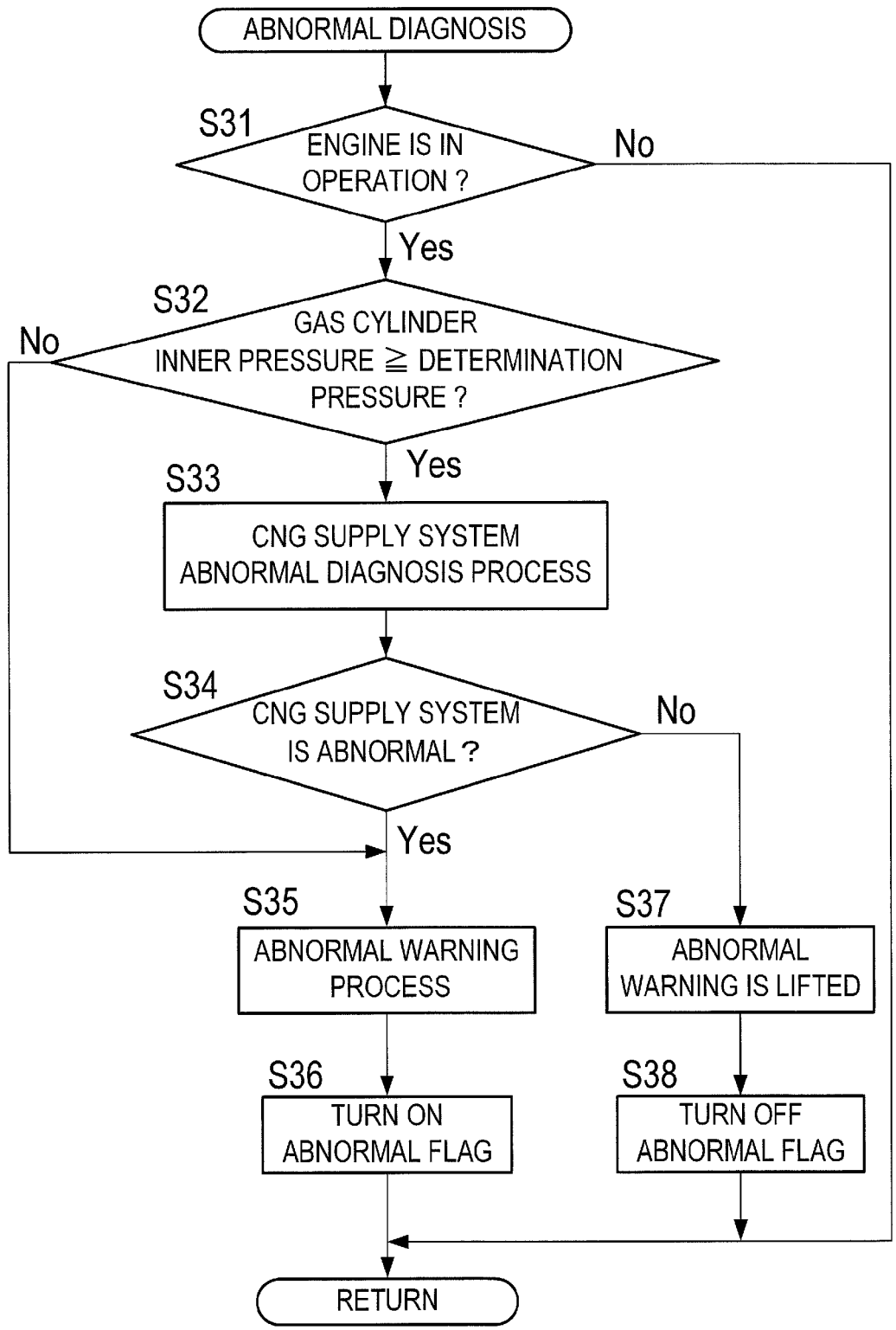
FIG. 5 is a flowchart showing an abnormal diagnosis routine executed by the ECU.

In the second embodiment, the abnormal diagnosis routine of FIG. 5 maybe executed as with the first embodiment, and the CNG mode may be stopped depending on a result of the routine. That is, when the abnormal flag is ON, the operating mode is switched to the plural fuel use mode even though the performance deterioration flag is ON.

The present invention is not limited to the above-described embodiments, and may be executed in various modes. For example, in the above-described embodiments, the gasoline and the CNG are switched. However, these fuels are supplied together, and a rate of supply quantities of these fuels maybe changed in this case. For example, in the CNG mode, not only the CNG but also the gasoline is supplied to the engine 1. The supply quantity of the gasoline is enough low as compared with the supply quantity of the CNG. In the gasoline mode, not only the gasoline but also the CNG is supplied to the engine 1. In this case, The supply quantity of the CNG is enough low as compared with the supply quantity of the gasoline.

In the plural fuel use mode, the rate between the supply quantity of the gasoline and the supply quantity of the CNG may be changed depending on the operating condition of the engine 1.

Fuels supplied to the engine in the fuel supply apparatus of the present invention is not limited to the gasoline and the CNG. For example, LP gas or hydrogen may be used in place of the CNG. Furthermore, light oil or alcohol fuel may be used in place of the gasoline. And, blended fuel which is blended alcohol and gasoline maybe used. In addition, the fuel supply apparatus of the present invention may be applied an internal combustion engine which is operated by three or more kinds of fuels. In this case, a first fuel and a second fuel which generates after combustion a smaller discharge quantity of harmful components as compared with the first fuel are existed. Thereby, it is possible to apply the present invention to this internal combustion engine.

The invention claimed is:

1. A fuel supply apparatus for an internal combustion engine applied to an internal combustion engine which can be operated by a first fuel and a second fuel which generates after combustion a smaller discharge quantity of harmful components as compared with the first fuel, wherein
the fuel supply apparatus comprising:
a fuel supply device which supplies separately the first fuel and the second fuel to the internal combustion engine;
an exhaust gas purifying catalyst which purifies exhaust gas discharged from the internal combustion engine;
a purifying performance determination device which determines whether or not an exhaust gas purifying performance of the exhaust gas purifying catalyst is deteriorated; and
a control device which controls an operation of the fuel supply device so as to supply the second fuel more than the first fuel to the internal combustion engine when the purifying performance determination device determines that the exhaust gas purifying performance of the exhaust gas purifying catalyst is deteriorated;
a first fuel storage device which stores the first fuel; and
a second fuel storage device which stores the second fuel, wherein
the control device adjusts a quantity of the first fuel and a quantity of the second fuel which are supplied to the internal combustion engine respectively by controlling the operation of the fuel supply device so that a predetermined quantity of the second fuel is remained in the second fuel storage device when the first fuel storage device is empty.

2. The fuel supply apparatus for the internal combustion engine according to claim 1, further comprising:
a first fuel quantity obtaining device which obtains a quantity of the first fuel capable of being supplied to the internal combustion engine, wherein
the control device controls the operation of the fuel supply device so as to supply the second fuel more than the first fuel to the internal combustion engine when the quantity of the first fuel obtained by the first fuel quantity obtaining device is equal to or lower than a predetermined determination quantity.

3. The fuel supply apparatus for the internal combustion engine according to claim 1, wherein
the fuel supply device includes a first fuel supply system which supplies the first fuel to the internal combustion engine and a second fuel supply system which supplies the second fuel to the internal combustion engine, wherein
the fuel supply apparatus further comprising,
an abnormal determination device which determines whether the second fuel supply system is abnormal, and
a warning device which gives a predetermined warning to a user of the internal combustion engine when the abnormal determination device determines that the second fuel supply system is abnormal.

4. The fuel supply apparatus for the internal combustion engine according to claim 1, wherein
the first fuel is a liquid fuel of hydrocarbon series, and the second fuel is a compressed natural gas.

* * * * *